United States Patent
Lee et al.

(10) Patent No.: US 9,391,314 B2
(45) Date of Patent: Jul. 12, 2016

(54) NEGATIVE ACTIVE MATERIAL, METHOD OF PREPARING THE SAME, AND RECHARGEABLE LITHIUM BATTERY INCLUDING THE SAME

(75) Inventors: Sang-Min Lee, Suwon-si (KR); Sung-Soo Kim, Suwon-si (KR); Goo-Jin Jeong, Suwon-si (KR); Nam-Soon Choi, Suwon-si (KR); Yong-Mook Kang, Suwon-si (KR); Min-Seok Sung, Suwon-si (KR); Leif Christensen, St. Paul, MN (US)

(73) Assignees: Samsung SDI Co., Ltd., Yongin-si (KR); 3M Innovation Properties Company, St. Paul, MN (US)

( * ) Notice: Subject to any disclaimer, the term of this patent is extended or adjusted under 35 U.S.C. 154(b) by 959 days.

(21) Appl. No.: 12/324,943

(22) Filed: Nov. 28, 2008

(65) Prior Publication Data

US 2009/0186273 A1      Jul. 23, 2009

(30) Foreign Application Priority Data

Nov. 27, 2007   (KR) .................. 10-2007-0121724

(51) Int. Cl.
| | |
|---|---|
| *H01M 4/38* | (2006.01) |
| *H01M 4/134* | (2010.01) |
| *H01M 4/1395* | (2010.01) |
| *H01M 10/0525* | (2010.01) |

(52) U.S. Cl.
CPC ............ *H01M 4/134* (2013.01); *H01M 4/1395* (2013.01); *H01M 4/38* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,482,547 B1 | 11/2002 | Yoon et al. | |
| 6,797,434 B1 | 9/2004 | Matsubara et al. | |
| 2005/0031957 A1* | 2/2005 | Christensen et al. | ...... 429/218.1 |
| 2005/0266314 A1* | 12/2005 | Sheem et al. | .............. 429/231.8 |
| 2009/0029253 A1 | 1/2009 | Itou et al. | |

FOREIGN PATENT DOCUMENTS

| | | |
|---|---|---|
| CN | 1301048 A | 6/2001 |
| EP | 1 361 194 A1 | 11/2003 |
| EP | 1 469 537 A2 | 10/2004 |
| EP | 2 108 209 | 10/2009 |
| JP | 2004-111108 | 4/2004 |

(Continued)

OTHER PUBLICATIONS

Yongyao Xia, Tetsuo Sakai, Takuya Fujieda, Masashi Wada, and Hiroshi Yoshinaga Flake Cu-Sn Alloys as Negative Electrode Materials for Rechargeable Lithium Batteries; 2001; Journal of the Electrochemical Society, 148, pp. A471-A481.*

(Continued)

*Primary Examiner* — Maria J Laios
(74) *Attorney, Agent, or Firm* — Lewis Roca Rothgerber Christie LLP

(57) ABSTRACT

A negative active material for rechargeable lithium batteries and a method of manufacturing the negative active material are provided. The negative active material for rechargeable lithium batteries includes at least one generally spherical assembly having flake-shaped materials that are capable of doping and dedoping lithium, and are arranged in a generally spherical shape defining a central pore. The negative active material imparts improved cycle-life characteristics.

12 Claims, 4 Drawing Sheets

(56) References Cited

FOREIGN PATENT DOCUMENTS

| JP | 2005-108523 | 4/2005 |
|---|---|---|
| JP | 2005-123175 | 5/2005 |
| JP | 2005-135925 | 5/2005 |
| JP | 2006-228640 | 8/2006 |
| KR | 10-2001-0068269 | 7/2001 |
| KR | 10-2007-0045977 | 5/2007 |
| KR | 10-0759556 B1 | 9/2007 |
| WO | WO 2004/049473 A2 | 6/2004 |
| WO | WO 2006/071076 A1 | 7/2006 |
| WO | WO 2006/118279 A1 | 11/2006 |

OTHER PUBLICATIONS

Office action dated Nov. 27, 2009, for corresponding European Patent Application No. 08169972.0.
Extended European Search Report dated Feb. 11, 2009, in corresponding European Patent Application No. 08169972.0, indicating the relevance of the listed references in this IDS.
Winter et al., "Insertion Electrode Materials for Rechargeable Lithium Batteries", Advanced Materials, Wiley VCH, Weinheim, DE, vol. 10, No. 10, Jan. 1998, XP002947071.
SIPO Office action dated Oct. 12, 2010 in corresponding Chinese patent application No. 200810181574.8 with English translation.
European Search Report dated Jan. 21, 2011, for corresponding European Patent application 08169972.0 noting listed reference in this IDS, as well as references previously filed in an IDS dated Mar. 12, 2009.
KIPO Notice of Allowance dated Dec. 30, 2010, for Korean priority Patent application 10-2007-0121724, noting listed references in this IDS, as well as an article previously cited in the Apr. 28, 2010 U.S. Office action.
SIPO Patent Gazette dated Dec. 7, 2011, for corrresponding Chinese Patent application 200810181574.8, 17 pages.
Japanese Office action dated Jan. 24, 2012, for correspnding Japanese Patent application 2008-01611, 6 pages.
Patent Abstracts of Japan, and English machine translation for Japanese Publication 2004-111108, listed above, 12 pages.
Patent Abstracts of Japan, and English machine translation for Japanese Publication 2005-108523, listed above, 12 pages.
Patent Abstracts of Japan, and English machine translation for Japanese Publication 2005-123175, listed above, 19 pages.
Patent Abstracts of Japan, and English machine translation for Japanese Publication 2005-135925, listed above, 20 pages.
Patent Abstracts of Japan, and English machine translation for Japanese Publication 2006-228640, listed above, 9 pages.
SIPO Office action dated May 11, 2011, for corresponding Chinese Patent application 200810181574.8, with English machine translation.

* cited by examiner

NEGATIVE ACTIVE MATERIAL, METHOD OF PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2007-0121724, filed in the Korean Intellectual Property Office on Nov. 27, 2007, the entire content of which is incorporated herein by reference.

BACKGROUND OF THE INVENTION

1. Field of the Invention

The present invention relates to a negative active material for rechargeable lithium batteries, methods of preparing the same and rechargeable lithium batteries including the same.

2. Description of the Related Art

Rechargeable lithium batteries contain materials that are capable of reversibly intercalating or deintercalating lithium ions in positive and negative electrodes, and include an organic electrolyte solution or a polymer electrolyte between the positive and negative electrodes. Rechargeable lithium batteries generate electric energy by oxidation and reduction reactions of lithium ions at the positive and negative electrodes.

Composite metal oxides such as $LiCoO_2$, $LiMn_2O_4$, $LiNiO_2$, $LiNi_{1-x}Co_xO_2$ (where, $0<x<1$), $LiMnO_2$, and so on have been researched for use as positive active materials.

Lithium metals have generally been used as a negative active material for the rechargeable lithium batteries. However, lithium metals can cause short circuits and pose potential threats of explosions due to the formation of dendrites. Therefore, carbonaceous materials such as amorphous carbons, crystalline carbons, etc., have recently been used as the negative active material in place of lithium metals. However, such carbonaceous materials can have irreversible capacity of 5 to 30% during the first several cycles, which wastes lithium ions, and prevents the active material from being fully charged and discharged. Therefore, carbonaceous negative active materials have poor energy densities.

While other metal negative active materials such as Si, Sn, and so on, are supposed to have high capacity, they have non-reversible capacity characteristics. Another material, such as tin oxide, has also been proposed as an alternative to the carbonaceous material negative active material. However, if the metal negative active material is included at 30% or less, the initial coulomb efficiency decreases. Further, as lithium ions are continuously intercalated and deintercalated to generate a lithium-metal alloy, the capacity further decreases and the capacity retention rate remarkably deteriorates after 150 charge and discharge cycles, thereby making it not commercially viable.

SUMMARY OF THE INVENTION

One embodiment of the present invention provides a negative active material for a rechargeable lithium battery having excellent cycle-life characteristics.

Another embodiment of the present invention provides a method of preparing the negative active material.

A further embodiment of the present invention provides a rechargeable lithium battery including the negative active material.

According to one embodiment of the present invention, a negative active material is provided for a rechargeable lithium battery that includes at least one generally spherical assembly. The spherical assembly includes an arrangement of flake-shaped materials that are arranged to form a central pore inside the spherical assembly. The flake-shaped materials are capable of doping and dedoping lithium and can include Si-based materials, Sn-based materials, Al-based materials, Ge-based materials, their alloys, or combinations thereof. The flake-shaped materials may have an average thickness ranging from 1 μm to 30 μm and an aspect ratio ranging from 1 to 3. The pores are spaces created during the formation of the spherical assembly. The pores may have an average diameter ranging from 0.1 μm to 5 μm. In one embodiment, the spherical assembly has a range of porosity between 20 and 80%.

According to another embodiment of the present invention, a method of fabricating a negative active material for a rechargeable lithium battery is provided. The method includes preparing flake-shaped materials that are capable of doping and dedoping lithium, mixing the flake-shaped materials and a polymer binder to form a mixture, and firing the mixture at a low temperature to form a plurality of spherical assemblies having pores therein.

According to a further embodiment of the present invention, a rechargeable lithium battery is provided that includes a negative electrode including the above negative active material, a positive electrode including a positive active material that is capable of reversibly intercalating and deintercalating lithium ions, and an electrolyte.

The negative active material includes pores in spherical assemblies formed from flake-shaped materials that are capable of doping and dedoping lithium, which helps improve the cycle-life characteristics of the batteries.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
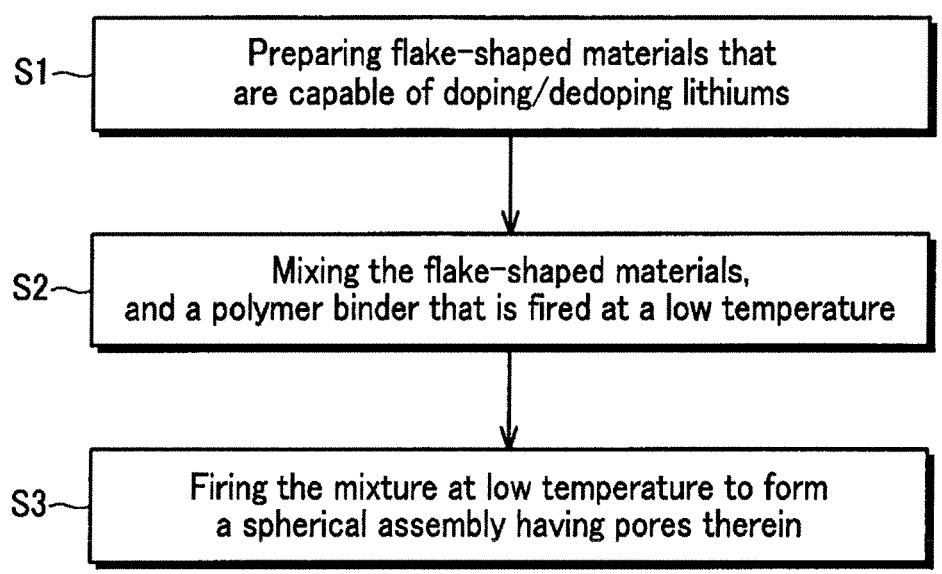
FIG. 1 is a flow chart showing steps of preparing a negative active material for rechargeable lithium batteries according to one embodiment of the present invention.

Negative active materials that are capable of doping and dedoping lithium such as Si-based or Sn-based negative active materials have been actively researched for use as high-capacity negative active materials. The Si-based or Sn-based negative active materials have high capacity but develop cracks due to volume expansion during charge and discharge cycles, thereby resulting in cycle-life deterioration. As a result, they are not yet commercialized.

Accordingly, in one embodiment of the present invention, a high-capacity negative active material is provided. The high-capacity negative active material can prevent physical lattice volume expansion and contraction during the charge and discharge cycles, and thus can reduce or prevent the cycle-life deterioration problems associated with the Si-based or Sn-based negative active materials.

The negative active material according to one embodiment of the present invention includes a spherical assembly arranged to form a pore inside the spherical assembly. The spherical assembly includes flake-shaped materials that are capable of doping and dedoping lithium.

Nonlimiting examples of suitable flake-shaped materials include Si-based, Sn-based material, Al-based, Ge-based materials, their alloys, and combinations thereof.

The flake-shaped material may be provided in a ribbon-type thin plate shape.

In one embodiment, the flake-shaped materials have an average thickness ranging from 1 µm to 30 µm. In another embodiment, the flake-shaped materials have an average thickness ranging from 1 µm to 20 µm. In yet another embodiment, the flake-shaped materials have an average thickness ranging from 1 µm to 10 µm. If the average thickness is less than 1 µm, the strength may decrease and thus the flake-shaped material can break easily. If the average thickness is more than 30 µm, the lithium ion diffusion distance during the doping and dedoping process may increase, thereby decreasing the kinetic performance.

The flake-shaped materials may have an aspect ratio ranging from 1 to 3. In one embodiment, the flake-shaped materials have an aspect ratio ranging from 1 to 2. The size of the spherical assembly can be controlled if the aspect ratio is within the above specified range. If the aspect ratio is out of the range, it is difficult to provide an assembly having appropriate-sized pores.

The spherical assembly may have an average particle diameter ranging from 1 µm and 15 µm. In one embodiment, the average particle diameter ranges from 4 µm to 12 µm. When the assembly has an average particle diameter less than 1 µm, the specific surface area is excessively large such that the initial efficiency may deteriorate. When the assembly has an average particle diameter more than 15 µm, excessive pores may form thereby decreasing the electrode density.

The pores are spaces formed during the assembly of the flake-shaped materials. The pores may have an average diameter ranging from 0.1 µm to 5 µm. In one embodiment, the pores have an average diameter ranging from 0.5 µm to 2 µm. When the average diameter of the pores is within the above specified ranges, it is possible to effectively absorb the volume expansion of the active material. When the average diameter is less than 0.1 µm, it is difficult to effectively absorb the volume expansion of the active material. If the average diameter is more than 5 µm, the strength may deteriorate.

The spherical assembly may have porosity between 20 and 80%. In one embodiment, the spherical assembly has porosity between 30 and 70%. When the porosity is within the above range, it is possible to effectively suppress the volume expansion of the active material. If it is less than 20%, it is difficult to suppress the volume expansion of the active material. If the porosity is more than 80%, the energy density of the electrode plate can deteriorate.

The negative active material can further include a polymer binder. Nonlimiting examples of suitable polymer binders include polyimide, polyvinyl alcohol, carboxylmethyl cellulose, hydroxypropyl cellulose, diacetyl cellulose, polyvinyl chloride, polyvinyl pyrrolidone, polytetrafluoroethylene, polyvinylidene fluoride, polyethylene, polypropylene, and combinations thereof. In one embodiment, polyimide is used as a binder.

As described above, the negative active material can prevent volume expansion during the charge and discharge cycle by having pores formed inside the spherical assembly. The pores are formed during the formation of the spherical assembly. Accordingly, the negative active materials with pores can solve or prevent cycle-life deterioration of the conventional negative active material.

According to another embodiment, a method of preparing the negative active material is provided. FIG. 1 is a flow chart showing steps of preparing the negative active material for rechargeable lithium batteries according to one embodiment of the present invention.

Another embodiment of the present invention provides a method of preparing a negative active material for rechargeable lithium batteries, which includes preparing flake-shaped materials that are capable of doping and dedoping lithium (S1), mixing the flake-shaped materials and a polymer binder that may be curable or volatilized at a low temperature (S2), and firing the mixture at a low temperature to form spherical assemblies having pores therein (S3).

First, the flake-shaped materials that are capable of doping and dedoping lithium are prepared (S1).

Nonlimiting examples of suitable flake-shaped materials include Si-based, Sn-based, Al-based, Ge-based materials, and their combinations thereof.

The flake-shaped materials may be provided in a ribbon-type or thin plate shape.

The flake-shaped materials can be prepared from metals or their alloys using a melt-spinning, mechanical ball milling, or twin-rolling technique. In one embodiment, melt-spinning is used. When the flake-shaped material is prepared by melt-spinning an alloy-based material, quenching should be performed at 1000 rpm or more because the alloy-based material has low crystallinity and is amorphous. In one embodiment, the quenching is performed at 1000 rpm to 5000 rpm.

Subsequently, the flake-shaped materials and a polymer binder are mixed (S2).

The flake-shaped materials that are capable of doping and dedoping lithium are the same as described above. The polymer binders can be removed at 400° C. or less. In one embodiment, the polymer binder can be removed at 150° C. to 400° C. Nonlimiting examples of suitable polymer binders include acrylate-based polymers, butadiene-based rubbers, and combinations thereof. Nonlimiting examples of suitable acrylate-based polymers include polymethylmethacrylate, and nonlimiting examples of suitable butadiene-based rubbers include polybutadiene rubbers. In addition, other polymers that are curable at low temperatures can also be used.

The flake-shaped materials that are capable of doping and dedoping lithium and polymer binders may be used at a weight ratio of 95:5 to 50:50. When the weight ratio is used within the above range, the assembly has appropriate strength. When the weight ratio is out of the range, the assembly has low strength, or the reactivity of the assembly may be reduced.

In one embodiment, a second binder may be further added to the mixture.

Nonlimiting examples of suitable second binders include polyimide, polyvinylalcohol, carboxylmethyl cellulose, hydroxypropyl cellulose, diacetyl cellulose, polyvinylchloride, polyvinyl pyrrolidone, polytetrafluoroethylene, polyvinylidene fluoride, polyolefins such as polyethylene or polypropylene, and combinations thereof. In one embodiment, polyimide is used.

In one embodiment, the polymer binder and the second binder can be used in a weight ratio ranging from 30:70 to 80:20. If the weight ratio is out of the specified range and the amount of the second binders is excessive, the porosity of the assembly may deteriorate. If the amount of polymer binder is above the specified range, the strength of the assembly may also deteriorate due to excessive pores.

Figure 2A:
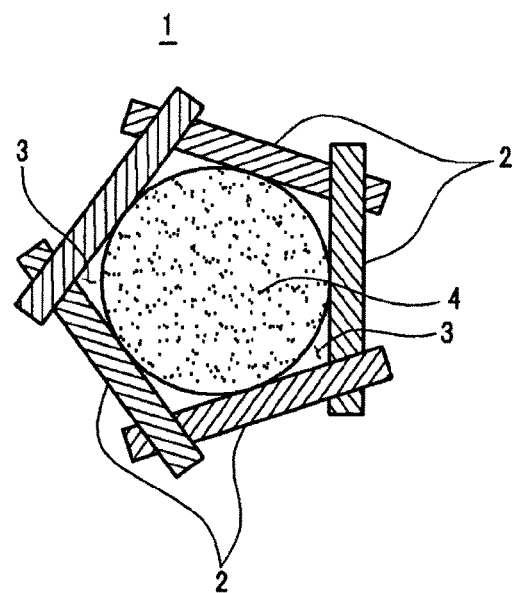
FIG. 2A illustrates a structure that includes a plurality of flake-shaped materials that is capable of doping and dedoping lithium and a polymer binder that is formed during a process of preparing the negative active material according to one embodiment of the present invention.

FIG. 2A shows one possible configuration of various flake-shaped materials (2) that are capable of doping and dedoping lithium and a polymer binder (4) formed during a preparation step of the negative active material according to one embodiment of the present invention.

Referring to FIG. 2A, the polymer binder 4 is disposed in a space 3 formed between flake-shaped materials 2 that are capable of doping and dedoping lithium. The polymer binder 4 attaches to each unit of the flake-shaped materials 2, thereby providing a stable structure in a shape of a spherical assembly after being fired at a low temperature.

The mixture is fired at a low temperature to volatilize the polymer binder and form a negative active material including the spherical assemblies with pores therein (S3).

The firing process is performed at a temperature less than or equal to 400° C. In one embodiment, the firing process is performed at 150 to 400° C. When the firing process is performed at less than or equal to 400° C., the particle crystallinity deterioration can be reduced or prevented. When the firing temperature is more than 400° C., the crystallinity of the metal thin plate may be damaged.

After the firing, the polymer binder filled in the space between the flake-shaped materials is volatilized to form a spherical assembly including flake-shaped materials and a pore therein.

Figure 2B:
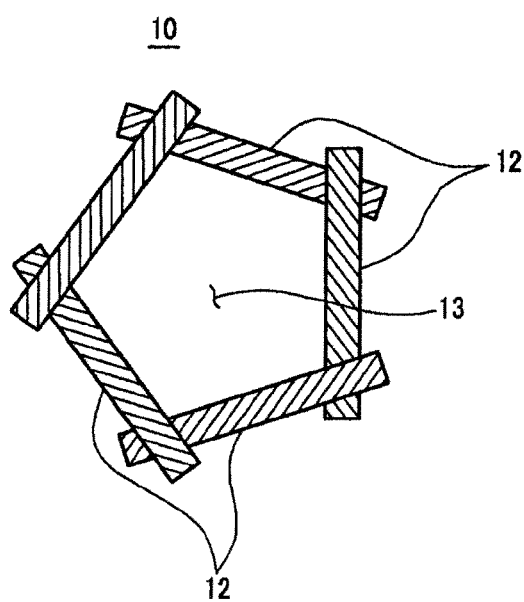
FIG. 2B shows a spherical assembly that is formed during a process of preparing the negative active material according to one embodiment of the present invention.

FIG. 2B shows a spherical assembly that is formed during a preparation step of the negative active material according to one embodiment of the present invention. The flake-shaped materials 12 contact each other to form a spherical assembly 10 including a pore 13 therein.

According to another embodiment of the present invention, a rechargeable lithium battery including the negative active material is provided. The rechargeable lithium battery may include a negative electrode, a positive electrode, and an electrolyte. The positive electrode may include a positive active material that is capable of reversibly intercalating and deintercalating lithium ions (lithiated intercalation compound). Suitable examples of positive active materials include a composite oxide including lithium and a metal selected from cobalt, manganese, nickel, or combinations thereof. Nonlimiting examples of suitable lithiated intercalation compounds include those represented by the following Formula nos. (1) to (24).

$$Li_aA_{1-b}M_bD_2, \quad \text{Chemical Formula 1}$$

where, $0.95 \leq a \leq 1.1$ and $0 \leq b \leq 0.5$.

$$Li_aE_{1-b}M_bO_{2-c}X_c, \quad \text{Chemical Formula 2}$$

where, $0.95 \leq a \leq 1.1$, $0 \leq b \leq 0.5$, and $0 \leq c \leq 0.05$.

$$LiE_{2-b}M_bO_{4-c}X_c, \quad \text{Chemical Formula 3}$$

where, $0 \leq b \leq 0.5$ and $0 \leq c \leq 0.05$.

$$Li_aNi_{1-b-c}Co_bM_cD_\alpha, \quad \text{Chemical Formula 4}$$

where, $0.95 \leq a \leq 1.1$, $0 \leq b, \leq 0.5$, $0 \leq c \leq 0.05$, and $0 < \alpha \leq 2$.

$$Li_aNi_{1-b-c}Co_bM_cO_{2-\alpha}X_\alpha, \quad \text{Chemical Formula 5}$$

where, $0.95 \leq a \leq 1.1$, $0 \leq b \leq 0.5$, $0 \leq c \leq 0.05$, and $0 < \alpha < 2$.

$$Li_aNi_{1-b-c}Co_bM_cO_{2-\alpha}X_2, \quad \text{Chemical Formula 6}$$

where, $0.95 \leq a \leq 1.1$, $0 \leq b \leq 0.5$, $0 \leq c \leq 0.05$, and $0 < \alpha < 2$.

$$Li_aNi_{1-b-c}Mn_bM_cD_\alpha, \quad \text{Chemical Formula 7}$$

where, $0.95 \leq a \leq 1.1$, $0 \leq b \leq 0.5$, $0 \leq c \leq 0.05$, and $0 < \alpha \leq 2$).

$$Li_aNi_{1-b-c}Mn_bM_cO_{2-\alpha}X_\alpha, \quad \text{Chemical Formula 8}$$

where, $0.95 \leq a \leq 1.1$, $0 \leq b \leq 0.5$, $0 \leq c \leq 0.05$, and $0 < \alpha < 2$.

$$Li_aNi_{1-b-c}Mn_bM_cO_{2-\alpha}X_2, \quad \text{Chemical Formula 9}$$

where, $0.95 \leq a \leq 1.1$, $0 \leq b \leq 0.5$, $0 \leq c \leq 0.05$, and $0 < \alpha < 2$.

$$Li_aNi_bE_cG_dO_2, \quad \text{Chemical Formula 10}$$

where, $0.90 \leq a \leq 1.1$, $0 \leq b \leq 0.9$, $0 \leq c \leq 0.5$, and $0.001 \leq d \leq 0.1$.

$$Li_aNi_bCo_cMn_dGeO_2, \quad \text{Chemical Formula 11}$$

where, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2, \quad \text{Chemical Formula 12}$$

where, $0.90 \leq a \leq 1.1$ and $0.001 \leq b \leq 0.1$.

$$Li_aCoG_bO_2, \quad \text{Chemical Formula 13}$$

where, $0.90 \leq a \leq 1.1$ and $0.001 \leq b \leq 0.1$.

$$Li_aMnG_bO_2, \quad \text{Chemical Formula 14}$$

where, $0.90 \leq a \leq 1.1$ and $0.001 \leq b \leq 0.1$.

$$Li_aMn_2G_bO_4, \quad \text{Chemical Formula 15}$$

where, $0.90 \leq a \leq 1.1$ and $0.001 \leq b \leq 0.1$.

$$QO_2, \quad \text{Chemical Formula 16}$$

$$QS_2, \quad \text{Chemical Formula 17}$$

$$LiQS_2, \quad \text{Chemical Formula 18}$$

$$V_2O_5, \quad \text{Chemical Formula 19}$$

$$LiV_2O_5, \quad \text{Chemical Formula 20}$$

$$LiZO_2, \quad \text{Chemical Formula 21}$$

$$LiNiVO_4, \quad \text{Chemical Formula 22}$$

$$Li_{(3-f)}J_2(PO_4)_3 \, (0 \leq f \leq 3), \quad \text{Chemical Formula 23}$$

$$Li_{(3-f)}Fe_2(PO_4)_3 \, (0 \leq f \leq 2), \quad \text{Chemical Formula 24}$$

In the above Formula nos. 1 to 24:
A is Ni, Co, Mn, or combinations thereof;
M is Al, Ni, Co, Mn, Cr, Fe, Mg, Sr, V, rare earth elements, or combinations thereof;
D is O, F, S, P, or combinations thereof;
E is Co, Mn, or combinations thereof;
X is F, S, P, or combinations thereof;
G is Al, Cr, Mn, Fe, Mg, La, Ce, Sr, V, or combinations thereof;
Q is Ti, Mo, Mn, or combinations thereof;
Z is Cr, V, Fe, Sc, Y, or combinations thereof; and
J is V, Cr, Mn, Co, Ni, Cu, or combinations thereof.

A sulfur-based material includes one or more of elemental sulfur, $Li_2S_n$ (where, $n \geq 1$), $Li_2S_n$ (where, $n \geq 1$) dissolved in a catholyte, an organosulfur compound, and a carbon-sulfur polymer $(C_2S_x)_n$ (where, $x = 2.5$ to $50$, $n \geq 2$) and may be used as an active material.

The negative and positive electrodes are prepared as follows. An active material, a conductive agent, and a binder are mixed in a solvent to provide an active material composition, and the composition is applied onto a current collector. Various methods of fabricating the electrodes are well known in the art, hence they will not be described.

Any electrically conductive material can be used as a conductive agent so long as it does not cause any chemical change. Nonlimiting examples of suitable conductive materials include natural graphite, artificial graphite, carbon black, acetylene black, ketjen black, carbon fiber, and metal powders or metal fibers, which include copper, nickel, aluminum, silver, etc. Other types of conductive materials can also be used. In one embodiment, a mixture of one or more conductors such as polyphenylene derivatives is used as a conductive agent.

Nonlimiting examples of suitable binders include polyvinylalcohol, carboxylmethyl cellulose, hydroxypolypropyl cellulose, diacetyl cellulose, polyvinylchloride, polyvinylpyrrolidone, polytetrafluoroethylene, polyvinylidene fluoride, polyethylene, polypropylene, and combinations thereof.

One nonlimiting example of a suitable solvent includes N-methylpyrrolidone.

In one embodiment, the electrolyte includes a non-aqueous organic solvent and a lithium salt.

The non-aqueous organic solvent acts as a medium for transmitting ions in the electrochemical reaction of the battery. Nonlimiting examples of suitable non-aqueous organic solvents include carbonate-based, ester-based, ether-based, ketone-based, alcohol-based, or aprotic solvents. Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Nonlimiting examples of suitable ester-based solvents include methyl acetate, ethyl acetate, n-propyl acetate, methylpropionate, ethylpropionate, γ-butyrolactone, decanolide, valerolactone, mevalonolactone, caprolactone, and so on. Nonlimiting examples of suitable ether-based solvents include dibutyl ether, tetraglyme, diglyme, dimethoxyethane, 2-methyltetrahydrofuran, tetrahydrofuran, and so on. Nonlimiting examples of suitable ketone-based solvents include cyclohexanone and so on. Nonlimiting examples of suitable alcohol-based solvents include ethanol, isopropyl alcohol, and so on. Nonlimiting examples of suitable aprotic solvents include nitrites such as X—CN (where, X is a C2 to C50 linear, branched, or cyclic hydrocarbon, a double bond, an aromatic ring, or an ether bond), amides such as dimethyl formamide, dioxolans such as 1,3-dioxolan, sulfolane, and so on.

The non-aqueous organic solvent may be used by itself or in combination with others. When the organic solvent is used in combination, the mixture ratio can be controlled in accordance with the desirable battery performance.

In one embodiment, the cyclic carbonate and the chain carbonate are preferably mixed together in a volume ratio ranging from 1:1 to 1:9. When the cyclic carbonate and the chain carbonate are mixed within the above range and the mixture is used as an electrolyte, the electrolyte performance may be enhanced.

The electrolyte of the present invention may further include mixtures of carbonate-based solvents and aromatic hydrocarbon solvents. In one embodiment, the carbonate-based solvents and the aromatic hydrocarbon are mixed together in a volume ratio ranging from 1:1 to 30:1.

The aromatic hydrocarbon-based organic solvent may be an aromatic hydrocarbon-based compound represented by the following Formula 25.

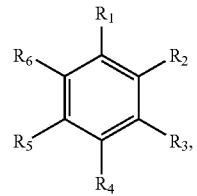

Chemical Formula 25 where, each of $R_1$ to $R_6$ is independently hydrogen, halogens, C1 to C10 alkyl groups, C1 to C10 haloalkyl groups, or combinations thereof.

Nonlimiting examples of suitable aromatic hydrocarbon-based organic solvents include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte may further include an overcharge inhibiting additive, such as ethylene carbonates, pyrocarbonates, and so on.

The electrolyte may be a solid electrolyte. Nonlimiting examples of suitable solid electrolytes include polyethylene oxide polymer electrolytes, polymer electrolytes with a polyorganosiloxane side chain or a polyoxyalkylene side chain, sulfide electrolytes, such as $Li_2S$—$SiS_2$, $Li_2S$—$GeS_2$, $Li_2S$—$P_2S_5$, and $Li_2S$—$B_2S_3$, or inorganic electrolytes, such as $Li_2S$—$SiS_2$—$Li_3PO_4$, and $Li_2S$—$SiS_2$—$Li_3SO_4$.

Figure 3:
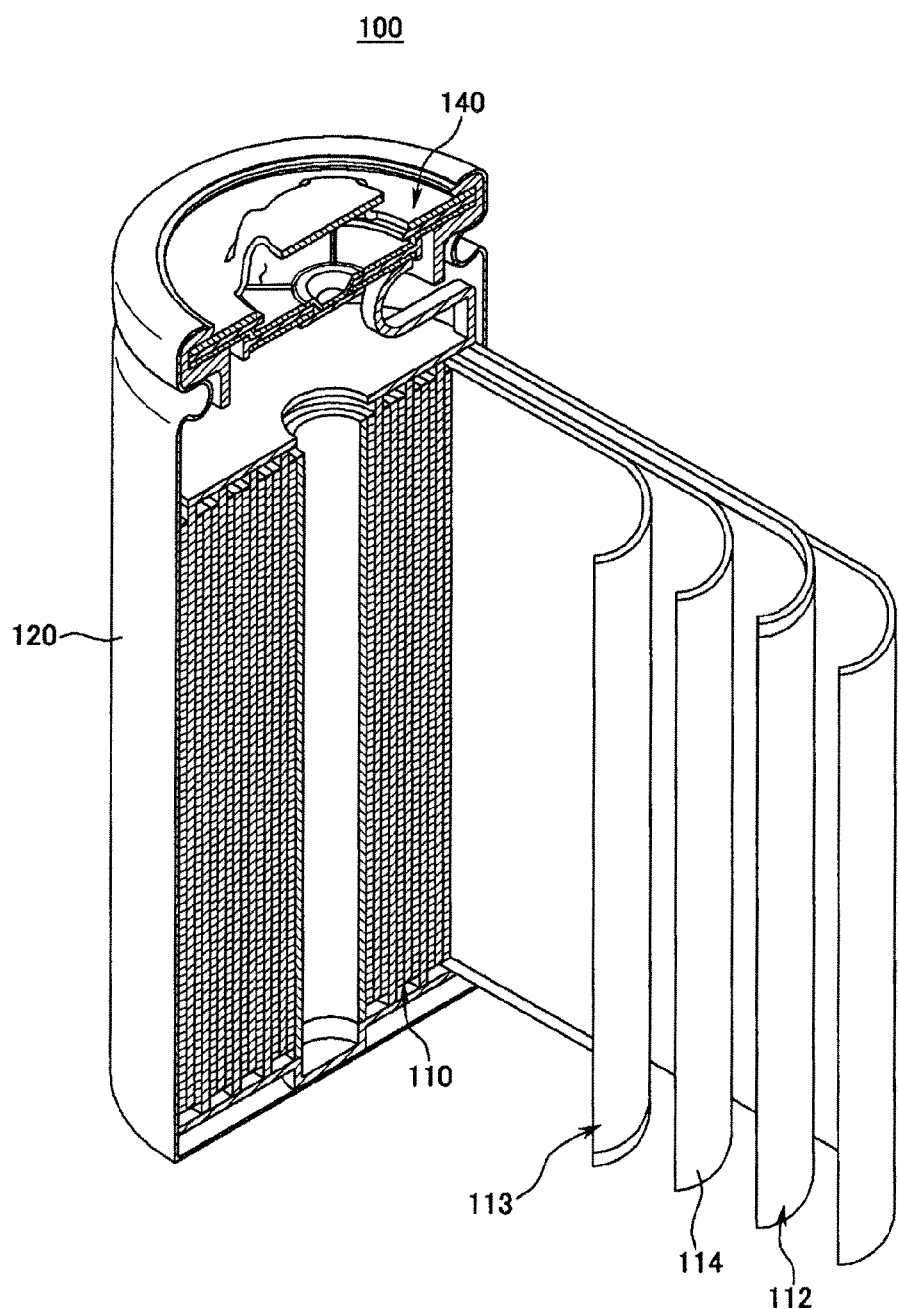
FIG. 3 is an exploded perspective view of a rechargeable lithium battery according to one embodiment of the present invention.

An exploded perspective view of a rechargeable lithium battery according to an embodiment of the present invention is shown in FIG. 3.

Referring to FIG. 3, the rechargeable lithium battery 100 includes an electrode assembly 110 in which a positive electrode 112 and a negative electrode 113 are disposed with a separator 114 interposed therebetween, and a case 120 formed with an opening on the end of one side in order to allow the electrode assembly 110 and an electrolyte solution be disposed therein. A cap assembly 140 is mounted on the opening of the case 120 to seal it. FIG. 3 shows a cylindrical battery of a rechargeable lithium battery according to one embodiment of the present invention, but the shape of the rechargeable lithium battery is not limited thereto, and may have other shapes such as prismatic or pouch shapes.

The following examples illustrate various embodiments in detail. However, it is understood that the present invention is not limited by these examples.

Example 1

A Si-based alloy was dissolved and melt-spun according to an arc-melting method and quenched at a speed of 4000 rpm to provide a ribbon-type thin plate having an average thickness of 5 μm and an aspect ratio of 2. The obtained ribbon-type thin plate and polymethylmethacrylate were mixed at a weight ratio of 85:15. The mixture was fired under a nitrogen atmosphere at 400° C. to provide a negative active material having an average pore size of 0.1 μm or more and porosity of 65%.

Example 2

A negative active material was prepared according to the same procedure as in Example 1, except that a ribbon-type thin plate, polymethylmethacrylate, and a binder of polyimide were mixed at a weight ratio of 85:7.5:7.5.

Example 3

A negative active material was prepared according to the same procedure as in Example 1, except that polybutadiene rubber was used instead of polymethylmethacrylate.

Example 4

A negative active material was prepared according to the same procedure as in Example 2, except that carboxymethyl cellulose was used instead of polyimide.

Example 5

A negative active material was prepared according to the same procedure as in Example 2, except that diacetyl cellulose was used instead of polyimide.

Example 6

A negative active material was prepared according to the same procedure as in Example 2, except that hydroxypropyl cellulose was used instead of polyimide.

Example 7

A negative active material was prepared according to the same procedure as in Example 2, except that polyvinylchloride was used instead of polyimide.

Example 8

A negative active material was prepared according to the same procedure as in Example 2, except that polyvinylpyrrolidone was used instead of polyimide.

Example 9

A negative active material was prepared according to the same procedure as in Example 2, except that polytetrafluoroethylene was used instead of polyimide.

Example 10

A negative active material was prepared according to the same procedure as in Example 2, except that polyvinylidene fluoride was used instead of polyimide.

Example 11

A negative active material was prepared according to the same procedure as in Example 2, except that polyethylene was used instead of polyimide.

Comparative Example 1

A Si-based alloy powder was used as a negative active material.

SEM Photograph Measurement

Figure 4:
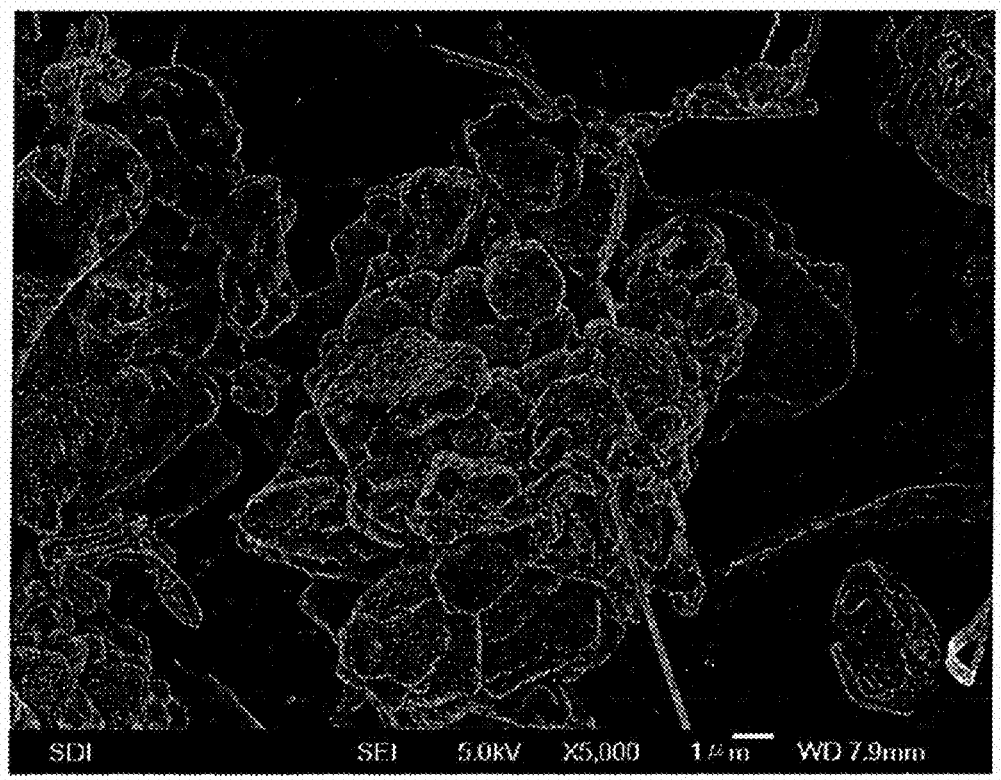
FIG. 4 is a 5000×-magnified SEM photograph of the negative active material prepared according to Example 1.

Each of negative active materials prepared from Examples 1 to 11 had a SEM photograph (5000×) taken, and a SEM photograph (5000×) of Example 1 is shown in FIG. 4. Referring to FIG. 4, a negative active material was formed of a spherical shaped assembly having an average particle diameter of about 10 μm. It was formed with pores having a diameter of 0.1 μm inside the assembly.

Other negative active materials of Examples 2 to 11 were also examined and have similar pore sizes.

Result of Measuring Discharge Capacity and Electrode Cycle-Life

After a coin cell was fabricated using the negative active material prepared in accordance with each of Examples 1 to 11 and Comparative Example 1, it was measured to determine the battery characteristics. The results of Examples 1 to 4 and Comparative Example 1 are shown in Table 1. Each coin cell prepared using the negative materials of Examples 1 to 11 and Comparative Example 1 was charged and discharged at 0.1 C for one cycle and had a formation process carried out, and discharge capacity retention (%) was calculated after repeating charge and discharge for 100 cycles relative to the discharge capacity after the first charge and discharge.

TABLE 1

| | Initial discharge capacity (mAh/g) | Assembly pore ratio (%) | $100^{th}$ cycle discharge capacity retention (%) |
|---|---|---|---|
| Example 1 | 760 | 65 | 70 |
| Example 2 | 790 | 45 | 90 |
| Example 3 | 810 | 50 | 80 |
| Example 4 | 770 | 60 | 85 |
| Comparative Example 1 | 800 | — | 30 |

Referring to Table 1, Examples 1 to 4 in which pores were formed at the inside of the negative active material had very high discharge capacity retention of 70% or more after 100 cycles.

It is shown that the negative active materials with pores having a certain range of diameters improve the cycle-life characteristics.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, which is also defined in the appended claims.

What is claimed is:

1. A negative active material for a rechargeable lithium battery, comprising:
    at least one generally spherical particle comprising a plurality of flake-shaped materials that are capable of doping and dedoping lithium, wherein the flake-shaped materials are arranged in a generally tangential configuration about a generally spherical central pore, wherein the central pore of the generally spherical particle is inside the generally spherical particle and has an average diameter ranging from 0.1 μm to 5 μm, and the flake-shaped materials comprise a Si-based material, a Sn-based material, an Al-based material, a Ge-based material, an alloy thereof, or a combination thereof.

2. The negative active material of claim 1, wherein the flake-shaped materials have an average thickness ranging from 1 μm to 30 μm.

3. The negative active material of claim 1, wherein the flake-shaped materials have an aspect ratio ranging from 1 to 3.

4. The negative active material of claim 1, wherein the central pore of the generally spherical particle has an average diameter ranging from 0.5 μm to 2 μm.

5. The negative active material of claim 1, comprising a plurality of generally spherical particles with a porosity between 20 and 80%.

6. The negative active material of claim 5, wherein the porosity is between 30 and 70%.

7. The negative active material of claim 1, further comprising a polymer binder comprising polyimide, polyvinyl alcohol, carboxylmethyl cellulose, hydroxypropyl cellulose, diacetyl cellulose, polyvinyl chloride, polyvinyl pyrrolidone, polytetrafluoroethylene, polyvinylidene fluoride, polyethylene, polypropylene, or a combination thereof.

8. A rechargeable lithium battery comprising:
   a negative electrode having a negative active material comprising:
   at least one generally spherical particle comprising a plurality of flake-shaped materials that are capable of doping and dedoping lithium, wherein the flake-shaped materials are arranged in a generally tangential configuration about a generally spherical central pore, wherein the central pore of the generally spherical particle is inside the spherical particle and has an average diameter ranging from 0.1 μm to 5 μm, and the flake-shaped materials comprise a Si-based material, a Sn-based material, an Al-based material, a Ge-based material, an alloy thereof, or a combination thereof;
   a positive electrode including a positive active material that is reversibly capable of intercalating and deintercalating lithium ions; and
   an electrolyte.

9. The rechargeable lithium battery of claim 8, wherein the flake-shaped materials have an average thickness ranging from 1 μm to 30 μm.

10. The rechargeable lithium battery of claim 8, wherein the flake-shaped materials have an aspect ratio ranging from 1 to 3.

11. The rechargeable lithium battery of claim 8, wherein the spherical particle has porosity between 20 and 80%.

12. The rechargeable lithium battery of claim 8, further comprising a polymer binder comprising polyimide, polyvinyl alcohol, carboxylmethyl cellulose, hydroxypropyl cellulose, diacetyl cellulose, polyvinyl chloride, polyvinyl pyrrolidone, polytetrafluoroethylene, polyvinylidene fluoride, polyethylene, polypropylene, or a combination thereof.

* * * * *